United States Patent
Shiohara

(10) Patent No.: US 9,319,590 B2
(45) Date of Patent: Apr. 19, 2016

(54) IMAGE CAPTURING DEVICE INCLUDING DISPLAY CONTROL SECTION THAT CAUSES DISPLAY DATA TO BE DISPLAYED IN FIRST AND SECOND DISPLAY REGIONS OF DISPLAY SCREEN, AND METHOD FOR CONTROLLING IMAGE CAPTURING DEVICE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 14/085,254

(22) Filed: Nov. 20, 2013

(65) Prior Publication Data

US 2014/0160339 A1 Jun. 12, 2014

Related U.S. Application Data

(60) Provisional application No. 61/729,123, filed on Nov. 21, 2012.

(30) Foreign Application Priority Data

Dec. 14, 2012 (JP) ................................ 2012-273119

(51) Int. Cl.
    *H04N 5/222* (2006.01)
    *H04N 5/232* (2006.01)
(52) U.S. Cl.
    CPC ................................ *H04N 5/23293* (2013.01)
(58) Field of Classification Search
    CPC .................................................. H04N 5/23293
    USPC .............................. 348/333.11, 441, 443, 448
    See application file for complete search history.

(56) References Cited

U.S. PATENT DOCUMENTS

| | | | |
|---|---|---|---|
| 5,196,939 A * | 3/1993 | Elabd et al. | 348/314 |
| 6,252,989 B1 * | 6/2001 | Geisler et al. | 382/232 |
| 2004/0095492 A1 * | 5/2004 | Baxter et al. | 348/302 |

(Continued)

FOREIGN PATENT DOCUMENTS

JP 2009-159067 A 7/2009

*Primary Examiner* — Usman Khan
(74) *Attorney, Agent, or Firm* — Global IP Counselors, LLP

(57) ABSTRACT

An object of the invention is to display image data generated based on output data of an image capturing sensor and information other than such image data in a period of the same length as a frame image capturing period of the image capturing sensor. With the invention, image data showing an image of an object is generated per line of a display section based on output data of an image capturing sensor, display data including the image data is caused to be displayed on a first display region of a display screen of the display section constructed by the first display region and a second display region with a line display period having a length of "a" or more to "b" or less after the image data of a plurality of lines is stored in the buffer, and display data that does not include the image data is caused to be displayed on the second display region with a line display period having a length of "a". "a" refers to a shortest length of the line display period of the display section in which a frame rate as display capability is higher than the frame rate of the image capturing sensor. Length "a" is shorter than "b" that refers to a maximum length of a period for generating image data of one line in a case where the image capturing sensor is operated at the image capturing sensor frame rate.

12 Claims, 6 Drawing Sheets

(56) References Cited

U.S. PATENT DOCUMENTS

| | | | |
|---|---|---|---|
| 2009/0080695 A1* | 3/2009 | Yang | 382/103 |
| 2010/0141784 A1* | 6/2010 | Yoo | 348/222.1 |
| 2011/0050991 A1* | 3/2011 | Bellers | H04N 7/0127 348/441 |
| 2011/0267529 A1* | 11/2011 | Tabata | 348/333.02 |
| 2011/0285694 A1 | 11/2011 | Shiohara | |
| 2011/0285734 A1 | 11/2011 | Shiohara | |
| 2011/0292236 A1 | 12/2011 | Shiohara | |
| 2011/0298962 A1 | 12/2011 | Shiohara | |
| 2011/0310268 A1 | 12/2011 | Shiohara | |
| 2011/0310269 A1 | 12/2011 | Shiohara | |
| 2012/0092542 A1 | 4/2012 | Kitano et al. | |
| 2013/0070109 A1* | 3/2013 | Gove et al. | 348/207.1 |

\* cited by examiner

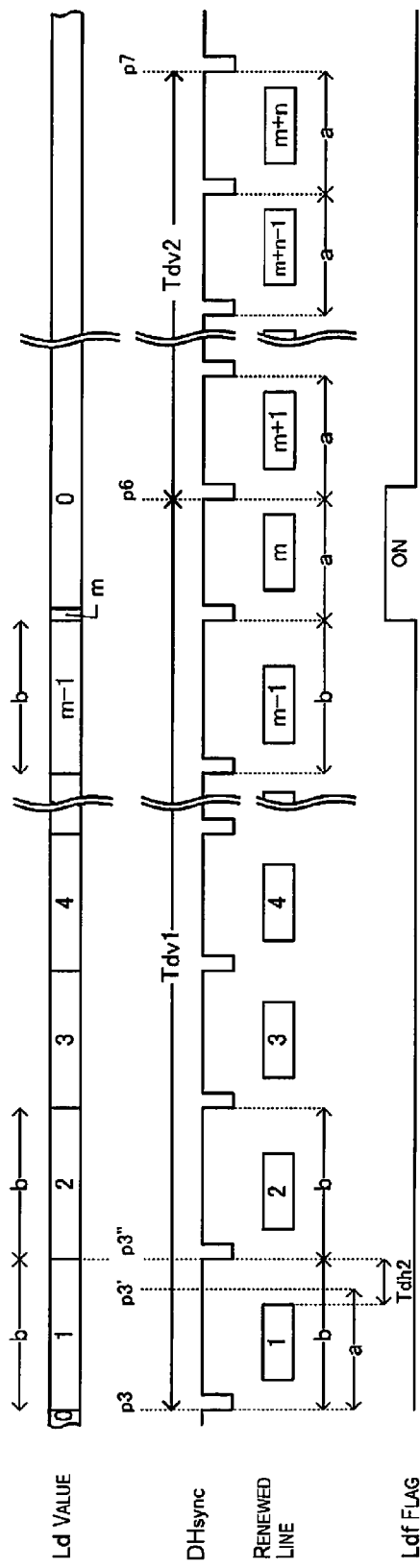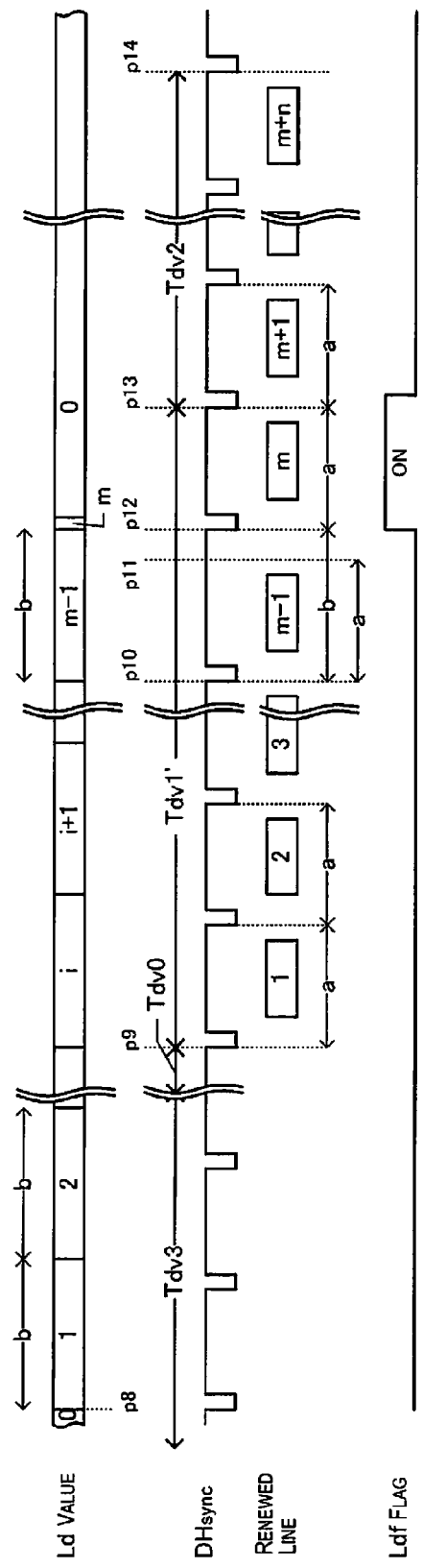
Fig. 4A
Fig. 4B

IMAGE CAPTURING DEVICE INCLUDING DISPLAY CONTROL SECTION THAT CAUSES DISPLAY DATA TO BE DISPLAYED IN FIRST AND SECOND DISPLAY REGIONS OF DISPLAY SCREEN, AND METHOD FOR CONTROLLING IMAGE CAPTURING DEVICE

CROSS-REFERENCE TO RELATED APPLICATIONS

This application claims the benefit of U.S. Provisional Application No. 61/729,123 filed on Nov. 21, 2012 and Japanese Patent Application No. 2012-273119 filed Dec. 14, 2012. The entire disclosure of U.S. Provisional Application No. 61/729,123 and Japanese Patent Application No. 2012-273119 is hereby incorporated herein by reference.

BACKGROUND

1. Technical Field

The present invention relates to an image capturing device and a method for controlling an image capturing device, and particularly relates to a live view display.

2. Background Technology

In an image capturing device in which a live view is displayed, it is conventionally known that there is a delay in displaying an image of an object with respect to the object. Patent Document 1 disclosed that a frame rate of a display element is a fraction of 1/integer of a frame rate of an image capturing element, and control is conducted such that delay time until an image captured by the image capturing element is displayed on the display element becomes almost uniform (paragraphs 0038-0047). Also, the delay time is controlled to be less than a frame period of the image capturing element (paragraph 0037).

Japanese Laid-open Patent Publication No. 2009-159067 (Patent Document 1) is an example of the related art.

SUMMARY

Problems to be Solved by the Invention

Various kinds of display objects can be displayed on a display screen of a display section including a case where an image (a live view) of an object generated based on output data of an image capturing sensor is displayed or a case where information such as image capturing conditions is displayed on a region different from a region for a live view display. When the aspect ratio of the image capturing sensor and the aspect ratio of the display screen of the display section are the same and the display screen does not have a region other than a region for displaying an image of an object, it is not so difficult to synchronize the image capturing sensor and the display section (display one frame in a period of the same length as the frame image capturing period of the image capturing sensor). However, when various display objects such as information for a live view or information other than for a live view are displayed on the display screen, it is not easy to synchronize the image capturing sensor and the display section. Incidentally, although Patent Document 1 describes that control is conducted to make the delay time per frame almost uniform, there is no specific mention of a configuration of the display screen in this document. The invention has been made to address the above-described circumstances, and an advantage of the invention is to display image data generated based on output data of an image capturing sensor and information other than such image data in a period of the same length as a frame image capturing period of the image capturing sensor.

Means Used to Solve the Above-Mentioned Problems

An image capturing device to achieve the above-described advantage has an image data generation section, a buffer, and a display control section. The image data generation section generates image data showing an image of an object per line of a display section based on output data of an image capturing sensor for capturing an image of an object. The buffer has capacity to store the generated image data of a plurality of lines. The display control section causes display data that includes the image data to be displayed on a first display region of a display screen of the display section constructed by the first display region and a second display region with a line display period having a length of "a" or more to "b" or less after the image data of a plurality of lines (one line or more) is stored in the buffer, and causes display data that does not include the image data to be displayed on the second display region with a line display period having a length of "a". "a" refers to a shortest length of the line display period of the display section in which the frame rate as display capability is higher than the frame rate of the image capturing sensor. "b" refers to a maximum length of a period for generating image data of one line in a case where the image capturing sensor is operated at the image capturing sensor frame rate. Time required for generating image data of one line can vary per line. "b" indicates the maximum time among a variable time. "a" and "b" have a relation of a<b. The first display region is a region composed of a plurality of lines, and the width (length in the horizontal direction) of the first display region is equal to the width (length in the horizontal direction) of the display screen. Also, the second display region is a region composed of a plurality of lines, and the width (length in the horizontal direction) of the second display region is equal to the width (length in the horizontal direction) of the display screen. When the "frame rate as display capability" in the display section does not "wait to start display of the next display target line until the display conditions are met" as described later, it means the frame rate at which an image of one frame can actually be displayed. Also, the image capturing sensor frame rate means the frame rate of the image capturing sensor when performing so-called live view display of displaying on the display section the image data generated based on output data of the image capturing sensor.

When a display on the first display region is started in a state where image data of a plurality of lines has not been stored in the buffer, if a line for which generation of image data has not been finished is tried to be displayed, a problem occurs. Such a problem caused by trying a display of a non-generated line can be avoided, for example, by displaying per line using the maximum time (b) required for generating image data of one line as the line display period of the first display region. With this, however, a period required for a display on the first display region cannot be made shorter than a period for outputting output data of one frame by the image capturing sensor. When the period required for a display on the first display region cannot be made shorter than the period for outputting output data of one frame by the image capturing sensor, a sufficient period for displaying image data that shows an image of an object generated based on output data of the image capturing sensor and also information other than the image data cannot be obtained within a period of the same length as the frame image capturing period of the image capturing sensor. According to the present configuration, therefore, a display on the first display region is started after storing of the image data of a plurality of lines in the buffer is finished. Since the image data stored in the buffer can be displayed immediately, a display can be conducted with the line display period of the shortest length "a" acceptable to the display section. Consequently, the present configuration can make the time required for a display on the first display section shorter compared to a configuration that displays all lines of the first display region with the line display period of the length "b", for example. (It is also possible shorten the display delay for each line of the first display region.) As a result, in addition to a period for displaying image data that shows an image of an object generated based on output data of the image capturing sensor, a period for displaying information other than the image data can be obtained within a period of the same length as the frame image capturing period of the image capturing sensor. A region that displays information other than image data that shows an image of an object generated based on output data of the image capturing sensor continuously in animated form (for example, letters or figures showing the image capturing conditions, or a still image) is referred to as the second display region.

According to the present configuration, since all lines are displayed on the second display region with the line display period of the length "a", the time required for a display on the second display region can be made shorter compared to a configuration that displays all the lines with the line display period of a length greater than "a". Since the time required for a display on the second display region can be made shorter, it is possible to contribute to achievement of the object that a period of the same length as the frame image capturing period of the image capturing sensor includes a period for a display on the second display region as well as a period for displaying image data on the first display region. The second display region is a region that displays display data (for example, letters or figures showing image capturing conditions and the like) that does not include image data generated based on output data of the image capturing sensor. Regarding image capturing conditions, information that can be displayed is specified in advance. Therefore, display data for a display on the second display region can be recorded on a memory before starting a display. Once recording of the display data on the memory is finished, a display on the display section becomes possible by referring to the memory and acquiring the display data sequentially. Consequently, for a display of display data on the second display region, there is no need to set a waiting period such as waiting per line until processing for generating the display data is finished, and a display can be conducted with the shortest length "a" of the line display period in the display section.

As described above, after storing of image data of a plurality of lines in the buffer is finished, a display on the first display region based on the image data is started. With this, a period for a display on the first display region can be made shorter than a period for outputting output data of one frame by the image capturing sensor. The time obtained by making the period for a display on the first display region shorter is devoted to a period for a display on the second display region. Also, since a display on the second display region can be conducted with the line display period of the shortest length "a", a period for a display on the second display region as well as a period for a display on the first display region can easily be included in a period of the same length as the frame image capturing period of the image capturing sensor. According to the present configuration, therefore, information other than image data that shows an image of an object generated based on output data of the image capturing sensor as well as the image data can be displayed within a period of the same length as the frame image capturing period of the image capturing sensor. Specifically, a display on the first display region of the display section is started after predetermined display delay time passes from a timing when outputting output data of one frame in the image capturing sensor is started, and image capturing and displaying can be conducted in a state of maintaining synchronization in which the length of the frame image capturing period and the length of the frame display period are equal. In a case where synchronization between them is not maintained, the display delay time (time from image capturing by the image capturing sensor until displaying image data based on the image capturing) is likely to vary widely per frame, and movement of an object looks awkward. Therefore, this is not user-friendly as a live view. According to the present configuration, however, it is possible to make movement of an object look natural on the first display region, and display the second display region as well as the first display region in one frame.

Further, in the image capturing device to achieve the above-described object, the display control section can wait to start a display of a next display target line until display conditions for displaying the next display target line are met, and display the next display target line after the display conditions are met. Processing time for processing to generate image data can vary per line. With respect to the first display region, therefore, the next display target line is not displayed until the display conditions for displaying the next display target line are met, and a display is conducted after the display conditions are met. As a result, compared to a configuration in which a display of any line is conducted uniformly with a line display period having the same length, an unnecessary wait in a case where a display is ready can be avoided, or a problem caused by displaying a line in which a display is not ready can be prevented from occurring. Also, compared to a configuration in which a display of any line is conducted uniformly with a line display period having the maximum length "b", the present configuration can make the time required for a display on the first display region shorter.

It is sufficient for the display conditions for displaying a next display target line to be conditions showing that the next display target line is ready for a display (no problem will occur when a display is conducted). Specifically, various embodiments are possible depending on the internal specifications of the image capturing device. With respect to a configuration that acquires information for determination to allow the display control section to determine whether the display conditions are met, various embodiments are possible depending on the internal specifications of the image capturing device. Alternatively, in a case of setting a phase difference of a length common to each line (for example, in Japanese Laid-open Patent Publication No. 2007-243615, $\Delta T$ is given for each frame period in the same mode, and a common phase difference is given for all the line periods of the image that is subject to display), a configuration is possible in which it is considered that the display conditions are met when time corresponding to that phase difference passes. Alternatively, as disclosed in Japanese Laid-open Patent Publication No. 2009-159067, in a case of setting a phase difference common to each line, a configuration is possible in which it is considered that the display conditions are met when time corresponding to that phase difference passes.

Further, in the image capturing device to achieve the above-described advantage, the display control section displays a current display target line on the first display region with the line display period of the length "a" in a case where there is no need to wait to start a display of the next display target line until the display conditions for displaying the next display target line are met. Specifically, in a case where there is no need to wait, a display of a current display target line can be finished with the line display period of the length "a", and it is thus possible to promptly move on to a line display period for displaying a next display target line. Therefore, it is possible to contribute to reduction in the time required for a display on the first display section. Incidentally, due to a configuration that waits until the display conditions are met and displays a display target line after the display conditions are met, and a configuration that displays with the line display period of the shortest length "a" in a case where there is no need to wait, the line display period with respect to the first display region varies per line with a range from "a" or more to "b" or less (the length is "b" at a maximum, the length is shorter than "b" when it does not take as much as the length "b", and the length is "a" at a minimum).

Further, in the image capturing device to achieve the above-described advantage, the image data generation section outputs the generated image data sequentially to the buffer. Also, in a case where the first display region is a region of "m" continuous lines ("m" is a natural number), the display control section causes a first line to an $m^{th}$ line of the first display region to be displayed with a line display period having a length of "a" or more to "b" or less based on the image data stored in the buffer after storing image data starting from the first line of the first display region up to an $i^{th}$ line ("i" is a natural number that satisfies 1≤i≤m) in the buffer is finished.

By starting a display of the first display region in a state where image data from the first line to the $i^{th}$ line (a plurality of lines) has already been stored, a display with the line display period of the shortest length "a" can be conducted because at least image data from the first line to an $(i-1)^{th}$ line is in a state of being able to be displayed immediately. Therefore, it is possible to contribute to reduction in the time required for a display on the first display section.

Also, another image capturing device to achieve the above-described advantage has an image data generation section, a buffer, and a display control section as described hereafter. The image data generation section generates for each line image data showing an image of the object based on output data of the image capturing sensor that captured the image of the object. The buffer stores the generated image data. The display control section causes display data that includes image data to be displayed on the first display region of the display screen of the display section, and causes display data that does not include the image data to be displayed on the second display region of the display screen. With this configuration, the line display period of the display section is shorter than the period in which one line of image data is generated when the image capturing sensor is operating at the image capturing sensor frame rate. Also, with this configuration, after a plurality of lines of the image data are stored in the buffer, the display control section displays at the first frame rate the first display region and the second display region on the display section in a state for which it is possible to display image data at a first frame rate higher than the image capturing sensor frame rate.

Also, with another image capturing device for achieving the above-described advantage, the display control section is configured so as to wait to start a display of the next target line until display conditions for displaying the next display target line are met, and display the next display target line after the display conditions are met. Also, until the image data of a plurality of lines is stored in the buffer, the display control section displays the first display region and the second display region at a second frame rate lower than the first frame rate.

Also, with another image capturing device for achieving the above-described advantage, the buffer stores image data of a plurality of lines of the $(N+1)^{th}$ frame while the display control section displays the $N^{th}$ frame at the second frame rate.

Also, with another image capturing device for achieving the above-described advantage, the display control section controls such that the first display region and the second display region are displayed after the image data of a plurality of lines is stored in the buffer. The buffer is acceptable as long as it achieves the object of its application, and this can also be configured using VRAM (video RAM) as the buffer.

Further, the technique of the invention in which display data that includes image data is displayed on the first region of the display screen with the line display period having a length of "a" or more to "b" or less and display data that does not include image data is displayed on the second region of the display screen with the line display period of the length "a" can be implemented as a program or a method invention. Also, the above-described device, program, or method can be implemented as a single device, or implemented by using a common part in a device having a complex function, and various kinds of embodiments are included.

BRIEF DESCRIPTION OF THE DRAWINGS

Referring now to the attached drawings which form a part of this original disclosure:

FIG. 4A and FIG. 4B are timing charts showing a display timing in the display section;

DETAILED DESCRIPTION OF EXEMPLARY EMBODIMENTS

Figure 1:
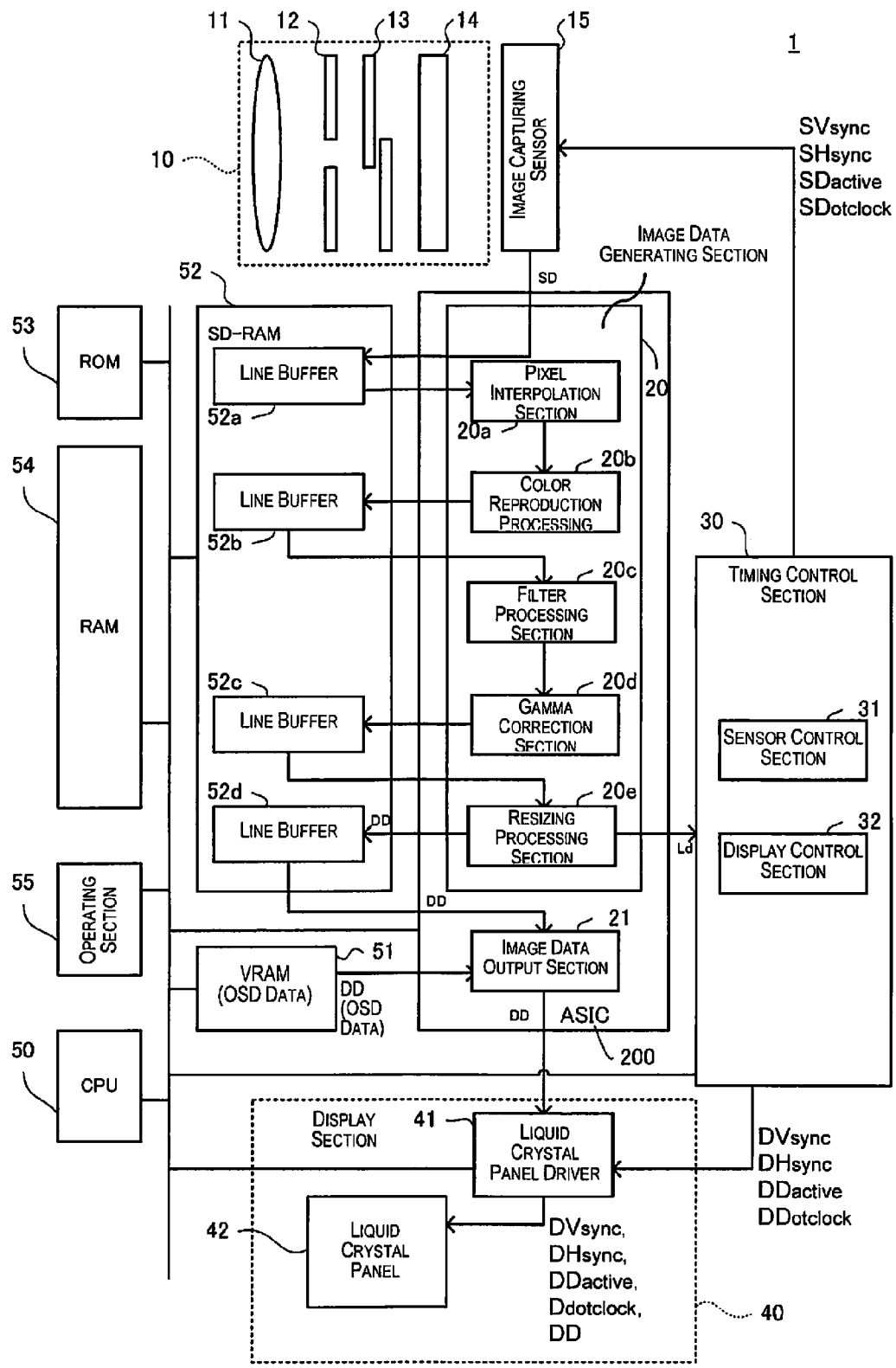
FIG. 1 is a block diagram showing a configuration of an image capturing device.

Hereinafter, embodiments of the invention will be explained with reference to the attached drawings. The corresponding components in the respective drawings are given the same reference numerals and overlapping explanations are omitted.

1. First Embodiment 1-1. Configuration of Image Capturing Device

FIG. 1 is a block diagram showing a configuration of an image capturing device 1 according to an embodiment of the invention. The image capturing device 1 has an optical system 10, an image capturing sensor 15, an ASIC 200, a timing control section 30, a display section 40, a CPU 50, a VRAM 51, an SD-RAM 52, a ROM 53, a RAM 54, and an operating section 55. The CPU 50 can execute a program recorded on the ROM 53 by using the VRAM 51, the SD-RAM 52, and the RAM 54 as appropriate. Through this program, the CPU 50 implements a function to generate image data that shows an object captured by the image capturing sensor 15 in response to an operation to the operating section 55. The operating section 55 has a shutter button, a dial switch as a mode changing unit for changing a mode, a dial switch for changing a diaphragm and a shutter speed, and a push button for operating various kinds of setting menus. A user can issue various kinds of instructions to the image capturing device 1 by operating the operating section 55.

The optical system 10 has a lens 11 to focus an image of an object on the image capturing sensor 15, a diaphragm 12, a shutter 13, and a low-pass filter 14. The lens H and the diaphragm 12 are attached to a case in a replaceable manner. The case is not shown in the drawing. The lens 11 is illustrated as a single lens in FIG. 1 for simplicity. However, the lens 11 includes a plurality of lenses arranged in an optical axis direction, and each lens is supported by an outer edge portion thereof. The low-pass filter 14 prevents moire from occurring in a captured image by intercepting a spatial high-frequency component of image capturing light in the image capturing sensor 15. The diaphragm 12 is composed of a plurality of light shielding plates that can change the aperture. The shutter 13 is a mechanical focal-plane type shutter.

The image capturing sensor 15 is a solid-state image capturing element such as a CMOS (Complementary Metal Oxide Semiconductor) image sensor provided with a color filter of a Bayer array and a plurality of photo diodes which store a charge corresponding to the amount of light in each pixel by photoelectric conversion, or a CCD (Charge Coupled Device) image sensor. The positions of the pixels of the image capturing sensor 15 are defined in coordinates of a Cartesian coordinate system. A line is formed with a plurality of pixels arranged in a direction parallel to one axis of coordinate, and a plurality of lines are arranged in a direction parallel to the other axis of coordinate. In the present specification, the direction parallel to the line is referred to as a horizontal direction, and the direction perpendicular to the line is referred to as a perpendicular direction. One screen constructed by all the pixels of the image capturing sensor 15 is referred to as one frame.

The timing control section 30 has a sensor control section 31 and a display control section 32. In the present embodiment, the image capturing sensor 15 conducts an operation in synchronization with various kinds of signals output by the sensor control section 31 of the timing control section 30. Specifically, the sensor control section 31 outputs a vertical synchronization signal (SVsync) that defines a period to read out detection results of the photo diodes in one frame, a horizontal synchronization signal (SHsync) that defines a period to read out detection results of the photo diodes in one line, and a dot clock signal (SDotclock) that defines a timing and the like to read out image data of each pixel. The image capturing sensor 15 starts outputting output data of one frame in response to the vertical synchronization signal SVsync, and sequentially reads out output data (SD) that shows detection results of the photo diodes corresponding to some pixels of the image capturing sensor 15 at a timing in response to the dot clock signal SDotclock within a period defined by the horizontal synchronization signal SHsync.

The ASIC 200 is provided with an image data generation section 20. The image data generation section 20 is constructed by a circuit that conducts processing for generating image data to display an image of an object on the display section 40 through pipeline processing by using line buffers 52a-52d for a plurality of lines that have been obtained in the SD-RAM 52 beforehand. The line buffers 52a-52d for a plurality of lines may be provided in the image data generation section 20 and the like. The ASIC 200 is also provided with an image data output section 21. The image data output section 21 outputs the image data (DD) recorded on the line buffer 52d to the display section 40 sequentially per line in order to display a line of a first display region R1 that is described below. As a result, an image of an object captured by the image capturing sensor 15 is displayed on the first display region R1. The image data output section 21 outputs OSD data recorded on the VRAM 51 as the image data (DD) to the display section 40 sequentially per line in order to display a line of a second display region R2. As a result, letters or figures such as image capturing conditions are displayed on the second display region R2. A user can confirm an object while using the display section 40 as an EVF.

The display section 40 is an EVF (Electronic View Finder) that allows a user to know information including a state of an object before image capturing and conditions of image capturing by displaying an image that shows an object as a target of image capturing. The image capturing device 1 according to the present embodiment is a mirror-less digital camera provided with such an EVF. The display section 40 has an interface circuit, a liquid crystal panel driver 41, a liquid crystal panel 42, an eye lens, and the like. The interface circuit and the eye lens are not shown in the drawing. According to the present embodiment, the liquid crystal panel 42 is a high-temperature polysilicon TFT (thin film transistor) provided with three sub-pixels that correspond to color filters of three colors per pixel, and the positions of the pixels are defined in coordinates of a Cartesian coordinate system. A line is formed with a plurality of pixels arranged in a direction parallel to one axis of coordinate, and a plurality of lines are arranged in a direction parallel to the other axis of coordinate. In the present specification, the direction parallel to the line is referred to as a horizontal direction, and the direction perpendicular to the line is referred to as a perpendicular direction. One screen constructed by all the pixels of the liquid crystal panel 42 is referred to as one frame.

The liquid crystal panel driver 41 outputs a signal for driving liquid crystal by applying a voltage to each sub-pixel to the liquid crystal panel 42. The liquid crystal panel 42 has a gate driver and a source driver which are not shown in the drawing. The gate driver controls a display timing in each pixel of each line in response to a signal output from the liquid crystal panel driver 41, and the source driver conducts a display by applying a voltage corresponding to image data of each pixel to each pixel of each line set at a display timing. Specifically, the liquid crystal panel driver 41 is configured to output various kinds of signals for a display on the liquid crystal panel 42 such as a vertical synchronization signal (DVsync) that defines a period to display one frame, a horizontal synchronization signal (DHsync) that defines a period to display one line, a data active signal (DDactive) that defines a period to take in image data in each line, a dot clock signal (DDotclock) that defines a timing and the like to take in image data of each pixel, and image data (DD) of each pixel.

The vertical synchronization signal DVsync, the horizontal synchronization signal DHsync, the data active signal DDactive, and the dot clock signal (DDotclock) described above are generated by the display control section 32 of the timing control section 30. In the present embodiment, the output timing of the horizontal synchronization signal DHsync is variable, and the output timing is determined depending on processing results of the image data generation section 20 as described below.

Figure 2A:
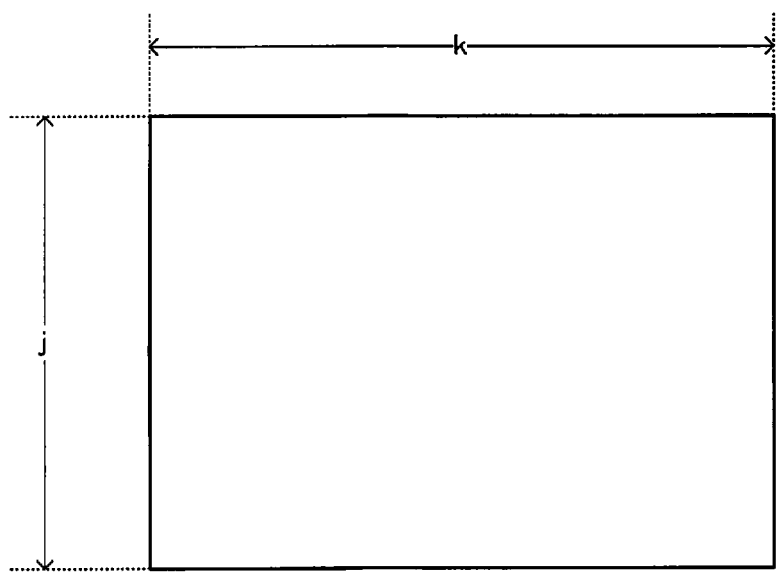
FIG. 2A is a diagram showing a readout pixel of an image capturing sensor at the time of a live view mode.

FIG. 2A is a diagram showing a readout pixel of the image capturing sensor 15 at the time of a live view mode according to the present embodiment. At the time of a live view mode, partial readout is conducted by excluding in the horizontal direction and the perpendicular direction with a predetermined method instead of reading out all detection results of the photo diodes that correspond to all the pixels of an effective region of the image capturing sensor 15. At the time of a live view mode, as a result of the partial readout, output data corresponding to "k×j" pixels composed of "k" pixels in the horizontal direction and "j" pixels in the perpendicular direction is output from the image capturing sensor 15 (actually, a ring pixel to conduct image processing to the surroundings of an effective pixel is required for outputting output data of "k×j" pixels from the image capturing sensor 15. Therefore, in order to output data of "k" pixels in the horizontal direction of FIG. 2A, "k+α" pixels greater than "k" need to be read in. In order to output data of "j" pixels in the perpendicular direction of FIG. 2A, "j+β" pixels greater than "j" need to be read in. Then, output data of "k×j" pixels is output from the image capturing sensor 15 by dropping "α" pixels in the horizontal direction and "β" pixels in the perpendicular direction. Here, for simplicity of the explanation, it is conveniently described that data of "k" pixels in the horizontal direction and "j" pixels in the perpendicular direction is output.). Here, the aspect ratio k:j is different from the aspect ratio of the first display region R1 described below. The line number "j" is greater than a line number "m" of the first display region R1 described below.

Figure 2B:
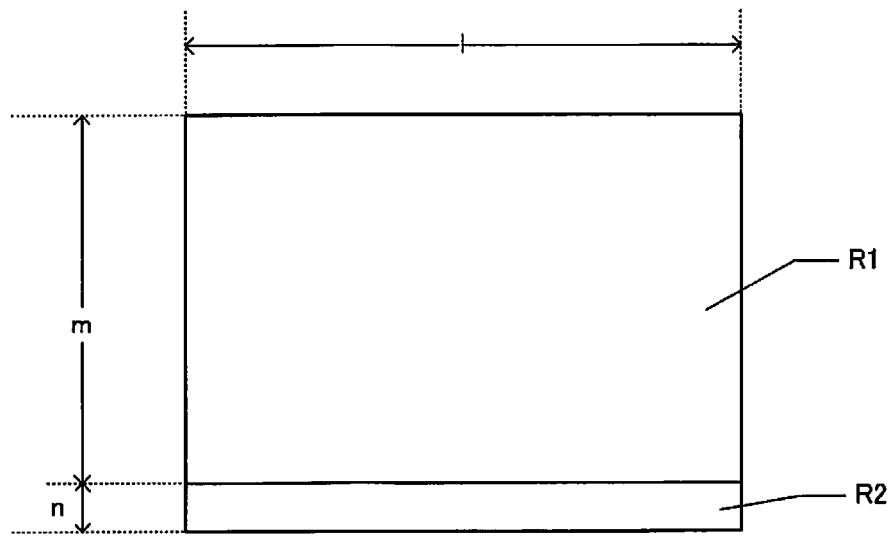
FIG. 2B is a diagram showing a configuration of a display screen of a display section at the time of a live view mode.

FIG. 2B is a diagram showing a screen configuration of a display screen of the liquid crystal panel 42 at the time of a live view mode according to the present embodiment. The liquid crystal panel 42 of the present embodiment is a panel having one effective pixel in the horizontal direction and (m+n) effective pixels in the perpendicular direction. The liquid crystal panel 42 can conduct a display in an arbitrary position with a tone corresponding to image data DD output from the liquid crystal panel driver 41 by adjusting the content and the output timing of the image data DD. In the present embodiment, an image of an object is displayed based on output data of the image capturing sensor 15 on the first display region R1 that is a region composed of the first line to the m$^{th}$ line of the liquid crystal panel 42. Letters or figures showing information such as image capturing conditions are displayed on the second display region R2 that is a region composed of "n" lines continuous with the first display region R1. Specifically, letters or figures showing information such as image capturing conditions as well as an image of an object are OSD (On Screen Display) displayed on the liquid crystal panel 42. The aspect ratio 1:(m+n) of the display screen of the liquid crystal panel 42 of the display section 40 is, for example, 4:3. The aspect ratio 1:m of the first display region R1 is, for example, 3:2.

When a user issues an instruction to capture an image by operating the operating section 55, the image capturing sensor 15 starts outputting output data of one frame in response to the vertical synchronization signal SVsync, and sequentially reads out output data that shows detection results of the photo diodes corresponding to all effective pixels of the image capturing sensor 15 at a timing in response to the dot clock signal SDotclock within a period defined by the horizontal synchronization signal SHsync. The image data generation section 20 generates image data of a format such as JPEG by using the SD-RAM 52 and the like, and the generated data is recorded on a removable memory and the like that is not shown in the drawing. In sum, a user can generate image data that shows an object.

1-2. Live View Display

Figure 3:
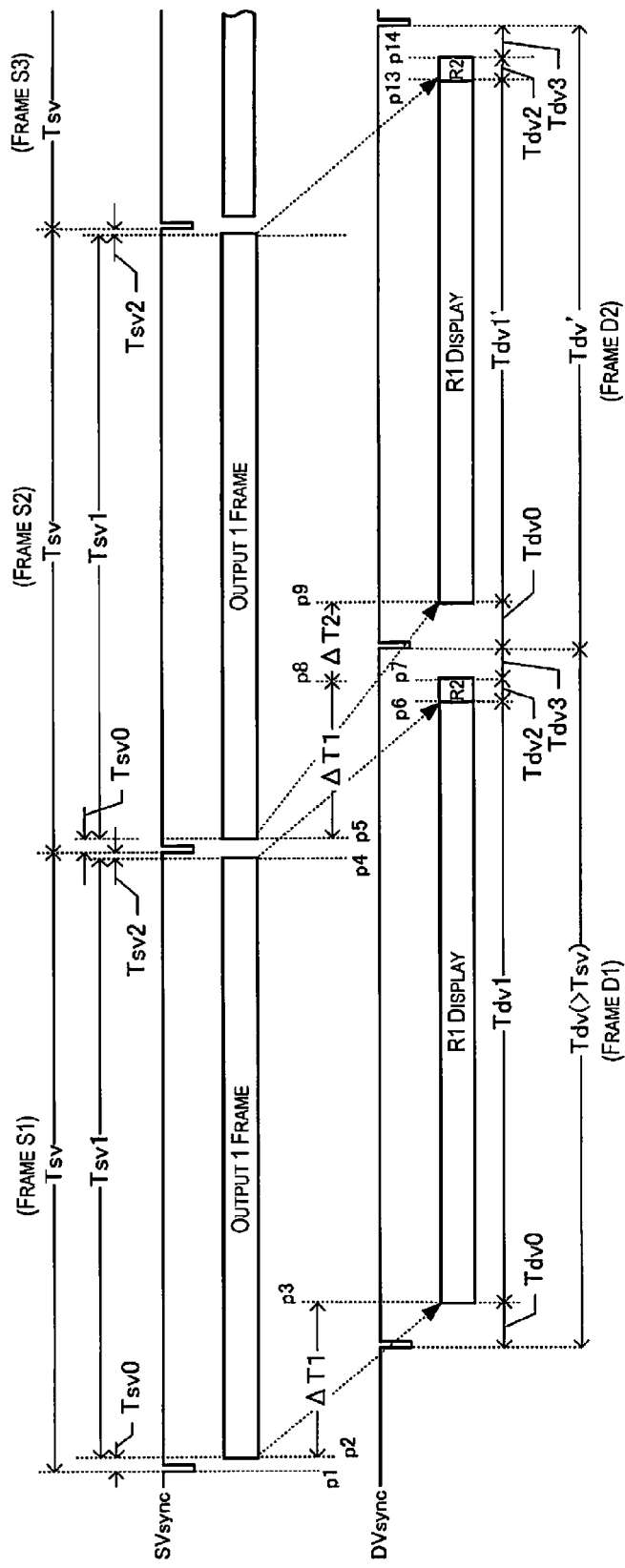
FIG. 3 is a timing chart showing operations of the image capturing sensor and the display section at the time of a live view mode.

FIG. 3 is a timing chart showing operations of the image capturing sensor 15 and the display section 40 at the time of a live view mode. At the time of a live view mode, output data of one frame is output from the image capturing sensor 15 in a vertical synchronization period Tsv (frame image capturing period) defined by the vertical synchronization signal SVsync. Furthermore, output data SD of one line of the image capturing sensor 15 is output in a horizontal synchronization period (line image capturing period) defined by the horizontal synchronization signal SHsync in the vertical synchronization period Tsv. The output data SD is temporarily recorded on the line buffer 52a. Also, at the time of a live view mode, in the display section 40, a display of one frame is renewed in a vertical synchronization period Tdv (frame display period) defined by the vertical synchronization signal DVsync. Furthermore, a display of one line of the display section 40 is renewed in a horizontal synchronization period (line display period) defined by the horizontal synchronization signal DHsync in the vertical synchronization period Tdv.

The process of generating image data DD based on the output data SD output from the image capturing sensor 15 will be described with reference to FIG. 1. When the image capturing sensor 15 outputs the output data SD to the line buffer 52a, the image data generation section 20 acquires the output data SD output by the image capturing sensor 15 from the line buffer 52a. A pixel interpolation section 20a calculates a tone value of two channels of color different from the color of the color filter provided in the photoelectric conversion element corresponding to each pixel by conducting interpolation processing to a target pixel using a tone value of a peripheral pixel of the target pixel. As a result, data in which three channels of tone values are associated with each pixel is generated. A color reproduction processing section 20b conducts color conversion processing for reproducing more correct color by conducting matrix operation of 3×3 to the tone value of each pixel of the data that has undergone the pixel interpolation. The data generated by the color conversion processing is temporarily recorded on the line buffer 52b.

A filter processing section 20c conducts filter processing such as sharpness adjustment or noise removal processing to the data that has undergone the color reproduction processing and has been recorded on the line buffer 52b. A gamma correction section 20d conducts processing to correct tone characteristics at the time of outputting an image. Specifically, the gamma correction section conducts gamma correction to the data that has undergone the filter processing, and the gamma correction is for correcting color shown by the tone value of output data of the image capturing sensor 15 by a gamma function corresponding to color characteristics in the display section 40. The data after the gamma correction processing is temporarily recorded on the line buffer 52c. A resizing processing section 20e sequentially refers to the data that has undergone the gamma correction processing to be recorded on the line buffer 52c, and resizes it to a desired size. According to the present embodiment, resizing is conducted so as to be the size of the first display region R1 shown in FIG. 2B. When resizing is finished in the resizing processing section 20e, the image data DD that has undergone each image processing in the ASIC 200 can be generated. The image data DD generated after the resizing processing is temporarily recorded on the line buffer 52d. The line buffer is a FIFO format line buffer, and image data is read out in line units in the sequence the image data was previously recorded in.

In order to conduct a display on the liquid crystal panel 42 with a delay period minimized based on the output data output from the image capturing sensor 15 sequentially per line, the present embodiment is configured such that the horizontal synchronization signal DHsync to display a line of the liquid crystal panel 42 is output after display conditions for displaying the line are met. More specifically, the display control section 32 of the timing control section 30 can acquire from the resizing processing section 20e a line number Ld that has undergone image data generation processing in the resizing processing section 20e and has been output to the line buffer 52d. The line number Ld means that the line shown by the line number Ld and the previous lines (lines from the first line to the Ld$^{th}$ line) can be displayed. Since the image data is generated sequentially per line, this means that the image data of a line whose number is smaller than the line number Ld in one frame has already been generated, and has already been output to the line buffer 52d. Accordingly, when the line number Ln of a next display target line is equal to or less than the line number Ld, the display conditions for displaying the next display target line are met. Incidentally, the line buffer 52d has a size that can record image data of "m" lines.

Therefore, the display control section 32 of the timing control section 30 is configured to start a display of a line that has met the display conditions on the liquid crystal panel 42 by outputting the horizontal synchronization signal DHsync in synchronization with a timing when the display conditions are met with respect to each line. With this configuration, a display of each line is not started until the image data is ready, and a display of each line can be conducted immediately after the display of each line is ready.

The value of the line number Ln of a next display target line is counted up every time the display control section 32 displays one line. The range of the value of the line number Ln of a next display target line is $1 \leq Ln \leq (m+n)$. The value of the line number Ld is counted up every time output of image data by the resizing processing section 20e to the line buffer 52d is finished, and the display control section 32 is notified. The range of the value of the line number Ld is $0 \leq Ld \leq m$. When the value of Ld is 0, image data has not yet been output to the line buffer 52d with even one line in one frame. At the point that the value of Ld is m (Ld=m), the frame data output finished flag Ldf flag is on, and the Ld value is reset to 0 (Ld=0). During the Ldf flag=On period even when Ld=0, this means that all of the image data of the first display region R1 has already been output to the live buffer 52d, so the display side can display the next display target line number Ln. The Ldf flag is reset at the point it is determined that display of the m$^{th}$ line is finished, returning to Ldf flag=Off.

The operation will be described in detail with reference to FIG. 3. In FIG. 3, after the vertical synchronization signal SVsync is output from the sensor control section 31 at a timing p1, the horizontal synchronization signal SHsync to acquire output data of the first line of the image capturing sensor 15 is output from the sensor control section 31 at a timing p2 when a period Tsv0 of a predetermined length passes. When the output data of the first line of the image capturing sensor 15 is output to the line buffer 52a, pipeline processing is conducted by the image data generation section 20, and the image data DD that has undergone the resizing processing is output to and stored in the line buffer 52d as described above. ΔT1 refers to time at least required for starting a display of the first line of the first display region R1 of the display section 40 from the timing p2 when an output period of the output data of one frame is started in the image capturing sensor 15. ΔT1 includes pipeline processing and the like by the image data generation section 20.

FIG. 4A is a timing chart showing a display timing in the vertical synchronization period Tdv of a frame D1 of the display section 40 shown in FIG. 3. In the frame D1 that is the first frame after a live view mode is started, image data of the first line is displayed immediately after the display conditions for image data of the first line are met without further waiting. Therefore, when it is confirmed that the value of the line number Ld becomes equal to the number Ln(=1) of a next display target line, the display control section 32 outputs the horizontal synchronization signal DHsync to display the first line (timing p3), and the image data DD of the first line is displayed. Subsequently, the display control section 32 outputs the horizontal synchronization signal DHsync and conducts a display when confirming that the display conditions are met in the same manner as above. The length of a period for renewing the value of the line number Ld is equal to the length of time required for generating image data of one line. Since time required for generating image data of one line varies, the length of the period for renewing the value of the line number Ld also varies. A maximum length of the period for renewing the line number Ld is referred to as "b". For example, FIG. 4A shows that the length of a period in which the value of the line number Ld is 1 is "b". This means that time from the timing p3 when generation of image data of the first line is finished and outputting to the line buffer 52d is finished up to a timing p3" when generation of image data of the second line is finished and outputting to the line buffer 52d is finished is the maximum length "b". Since the display control section 32 waits to output the horizontal synchronization signal DHsync until the number Ln of the next display target line becomes equal to or less than the line number Ld, and outputs at a timing when the number Ln becomes equal to or less than the line number Ld, the maximum length of the horizontal synchronization period (line display period) is also "b". It is also possible to generate the vertical synchronization signal DVsync for starting the frame D1 after the display control section 32 confirms that the line number Ld value has changed from 0 to 1.

More specifically, the display control section 32 outputs the horizontal synchronization signal DHsync at the timing p3, and then displays image data of one line per pixel by synchronizing with the dot clock signal DDotclock that is not shown in the drawing. The display of image data of one line has already been finished at a timing p3' when time of a length "a" passes from the timing p3, and the value of the number Ln of the next display target line is 2. However, since the value of the line number Ld is still 1 at the timing p3', the display control section 32 waits to output the horizontal synchronization signal DHsync to display a next display target line until Ln≤Ld is achieved by extending the length of a front porch period Tdh2 of the line display period of the first line that is a current display target line. More specifically, the length of the front porch period Tdh2 is extended by generating a dummy dot clock signal DDotclock or extending the period of the dot clock signal DDotclock, for example. In a case where there is no need to wait until the display conditions for displaying a next display target line are met in the first display region R1, the line display period of the current display target line is finished with the shortest length "a". For example, in a period of displaying the m$^{th}$ line of FIG. 4A, there is no need to wait until the display conditions for displaying the (m+1)$^{th}$ line that is the next display target line are met as described below. Therefore, the length of the line display period of the m$^{th}$ line that is the current display target line is the shortest length "a". More specifically, the frame data output finished flag Ldf flag is on during the period that the m$^{th}$ line of FIG. 4A is displayed. In the period when the Ldf flag=On, output of all the image data of the first display region R1 to the line buffer 52d is already finished, so the display side can display the next display target line number Ln, and the length of the period for displaying the $m^{th}$ line is she shortest length "a". As described later, the length of the display period for the $(m+1)^{th}$ line to the $(m+n)^{th}$ line is also the shortest length "a".

As shown in FIGS. 2A and 2B, output data of "j" lines of the image capturing sensor 15 is resized to image data of "m" lines by the resizing processing section 20e. Therefore, as shown in FIG. 4A, a display of image data of "m" lines, that is, a display on the first display region R1 is finished in a period Tdv1 from the timing p3 when the horizontal synchronization period to display image data of the first line is started up to a timing p6 when the horizontal synchronization period to display image data of the $M^{th}$ line is ended. As shown in FIG. 4A, when the operations of generating display data of one line, outputting it to the line buffer 52d, and then displaying the line are repeated, the length of the display period Tdv1 of the first display region R1 in the frame D1 becomes equal to the length of a period Tsv1 of outputting output data of one frame (output data of "j" lines).

After a display on the first display region R1 is finished, the $(m+1)^{th}$ line and the subsequent lines are displayed on the second display region R2. Here, a frame rate Fdmax as display capability of the display section 40 is higher than an actual driving frame rate Fs of the image capturing sensor 15 (Fdmax>Fs). Specifically, in a case where the display section 40 is driven at the frame rate Fdmax instead of waiting to output the horizontal synchronization signal DHsync until the display conditions are met, the vertical synchronization period (frame display period) of the display section 40 becomes shorter than the vertical synchronization period (frame image capturing period) of the image capturing sensor 15. Also, the length of the horizontal synchronization period in the case of driving the display section 40 at the frame rate Fdmax (that is, the shortest length of the line display period acceptable to the display section 40) "a" is shorter than the maximum length "b" of the period of generating image data of one line in a case where the image capturing sensor 15 is driven at the frame rate Fs (a<b).

Data (OSD data) displayed on the second display region R2 such as letters or figures showing information such as image capturing conditions is information independent from the operation of the image capturing sensor 15, and can be generated and recorded on the VRAM 51 in advance. Alternatively, OSD data can be generated and recorded on the VRAM 51 as needed independently from a live view display. Therefore, even when a display based on the OSD data is conducted with a shorter horizontal synchronization period, an appropriate display can be conducted without causing overtaking in reading out of data. Thus, for a display of the OSD data on the second display region R2, each line of the second display region R2 is displayed with the line display period (horizontal synchronization period) of the shortest length "a" that is shorter than "b" and is acceptable to the display section 40.

As shown in FIG. 4A, the display control section 32 outputs the horizontal synchronization signal DHsync with the line display period of the length "a" and displays the OSD data per line with the line display period of the length "a" with respect to the $(m+1)^{th}$ line to the $(m+n)^{th}$ line. As a result, a display of the second display region R2 can be conducted with a period Tsv2 of a length shorter than a case of displaying the $(m+1)^{th}$ line to the $(m+n)^{th}$ line with the line display period longer than "a". As shown in FIG. 3, after the display period Tsv2 of the second display region R2 ends at a timing p7 and a front porch period Tdv3 of the frame D1 passes, the display control section 32 outputs the vertical synchronization signal DVsync. As shown in FIG. 3, the vertical synchronization period Tdv of the frame D1 is composed of a back porch period Tdv0, the display period Tdv1 of the first display region R1, the display period Tdv1 of the second display region R2, and the front porch period Tdv3. The vertical synchronization period Tsv of the image capturing sensor 15 is composed of the period Tsv0 of a predetermined length, the output period of one frame Tsv1, and the period Tsv2 of a predetermined length. Although the length of the output period Tsv1 of a frame S1 and the length of the display period Tdv1 of the first display region R1 of the frame D1 are almost equal (since the sensor has an extra output period inherent to the sensor, it is not exactly equal), a display of the second display region R2 still needs to be conducted in the frame D1, and the front porch period Tdv3 needs to be included in the frame D1. However, the length of (the period Tdv2+the period Tdv3) is longer than the length of the remaining period Tsv2 of the vertical synchronization period Tsv of the image capturing sensor 15. Therefore, the vertical synchronization period Tdv of the display section 40 is longer than the length (1/Fs) of the vertical synchronization period Tsv of the image capturing sensor 15 in the frame D1.

Consequently, in a frame D2 immediately after the frame D1 in which the vertical synchronization period Tdv of the display section 40 is longer than the length (1/Fs) of the vertical synchronization period Tsv of the image capturing sensor 15, a display of the first display region R1 of a next frame cannot be started yet at a timing p8 when ΔT1 passes from a timing p5 (in FIG. 3, the timing p8 is still in the period of the previous frame D1). Compared to the case where a display of the first display region R1 can be started at the timing p3 when ΔT1 passes from the timing p2 in the frame D1, the timing of starting a display on the first display region R1 in the frame D2 is later than in the frame D1 by ΔT2. On the other hand, after the timing p8 when ΔT1 passes from the timing p5 that starts the output period Tsv1 of a frame S2, outputting image data of the first line and the subsequent lines to the line buffer 52d is started. Outputting image data of a plurality of lines (here, "i" lines. "i" is a natural number that satisfies 1≤i≤m) from the first line to the line buffer 52d is finished in the period of ΔT2 from the timing p8 to a timing p9 (in other words, ΔT2 can be described as time required for storing image data of "i" lines from the first line in the line buffer 52d). Therefore, as shown in FIG. 4B, the value of the line number Ld is "i" at the timing p9.

As shown in FIG. 4B, the display conditions (Ln≤Ld) are met at the timing p9 in which the number Ln of a next display target line is 1 and the line number Ld is "i", the display control section 32 outputs the horizontal synchronization signal DHsync to display the first line at the timing p9, and the first line is displayed with the shortest length "a". With respect to the second line and the subsequent lines, in a case where there is no need to wait until the display conditions (Ln≤Ld) are met by extending the line display period to be longer than "a", the display control section 32 outputs the horizontal synchronization signal DHsync with the period of the shortest length "a". Since the period to renew the value of the line number Ld is longer than "a", a timing that does not meet the display conditions, that is, a timing that causes Ln>Ld can occur while the horizontal synchronization signal DHsync is output with the period of the shortest length "a". For example, the number Ln of a next display target line is "m" at a timing p11 when time of a length "a" passes after the horizontal synchronization signal DHsync to display the $(m-1)^{th}$ line is output at a timing p10 shown in FIG. 4B. However, since the value of the line number Ld is still (m−1), Ln>Ld occurs. In such a case, the display control section 32 waits to output the horizontal synchronization signal DHsync until Ln≤Ld occurs, and the display control section 32 outputs the horizontal synchronization signal DHsync after Ln≤Ld occurs (timing p12).

After the horizontal synchronization signal DHsync to display the last line of the first display region R1 at the timing p12, a display on the second display region R2 is conducted in the same manner as described above. Specifically, a display is conducted per line with the period of the length "a". As described above, in the first display region R1 of the frame D2, image data of "i" lines from the first line has already been stored in the line buffer 52d at the time of starting a display of the first line, and at least (i−1) lines are available for a display with the line display period of the shortest length "a". Therefore, the length of a display period Tdv1' of the first display region R1 of the frame D2 is shorter than the length of the display period Tdv1 of the first display region R1 in a case where image data of only the first line has been stored at the time of starting a display of the first line as in the frame D1 (see FIG. 3). Incidentally, with respect to the display period Tsv2 of the second display region R2, since there is no change in the line number ("n" lines) and the horizontal synchronization period (length "a"), the length is the same in any frame.

As a result, a vertical synchronization period Tdv' of the frame D2 is shorter than the vertical synchronization period Tdv of the frame D1. Also, when the following equation (1) is satisfied in the frame D2, the length of the vertical synchronization period Tdv' of the frame D2 can be made equal to the length of the vertical synchronization period Tsv of the image capturing sensor 15.

Length of display period $Tdv1'$ ≤ (Length of vertical synchronization period $Tsv$ of image capturing sensor 15) − (length of period $Tdv0$ + length of period $Tdv2$ + Reference length of period $Tdv3$)  (1)

It is apparent that the length of the vertical synchronization period Tdv' of the frame D2 becomes the same as the length of the vertical synchronization period Tsv of the image capturing sensor 15 when the left part of equation (1) is equal to the right part of equation (1). Even when the left part of equation (1) is less than the right part of equation (1), the length of the vertical synchronization period Tdv' of the frame D2 can be made equal to the length of the vertical synchronization period Tsv of the image capturing sensor 15 by extending the front porch period Tdv3 of the frame D2 to be longer than a predetermined reference length (for example, by generating a dummy horizontal synchronization signal DHsync or by extending the length of one or more horizontal synchronization periods in the front porch period Tdv3).

The length of the display period Tdv1' of the first display region R1 of the frame D2 is affected by the number of lines that have already been stored in the line buffer 52d at the timing p9. It is sufficient for this number of lines to be a line number that satisfies equation (1). In this manner, the display period of the first display region R1 can be made shorter than the period Tsv1 by displaying image data of lines that have already been stored in the line buffer 52d with the shortest length "a" of the line display period of the display section 40 on the first display region R1 (by waiting to display image data of lines that have not yet been stored until the display conditions are met and displaying after the display conditions are met). Also, by displaying all the lines on the second display region R2 with the shortest length "a", time required for a display can be made shorter compared to a case of displaying all the lines with a period of a length greater than "a". As a result, display data such as OSD data can be displayed as well as image data based on output data of the image capturing sensor 15 in a period of the same length as the vertical synchronization period Tsv of the image capturing sensor 15, and the image capturing sensor 15 and the display section 40 can be operated in synchronization with each other. Also, in the frame next to the frame D2 and the subsequent frames, the image capturing sensor 15 and the display section 40 can be operated in synchronization with each other in a state where the time difference (display delay time) between the start timing of the output period Tsv1 of the image capturing sensor 15 and the start timing of the display period Tdv1' of the first display region R1 of the display section 40 is ΔT1+ΔT2. Incidentally, it may be possible to control the operation timing of the display section 40 such that the time difference (display delay time) between the start timing of the output period Tsv1 of the image capturing sensor 15 and the start timing of the display period of the first display region R1 of the display section 40 is ΔT1+ΔT2 from the first frame after starting a live view mode. Specifically, in the example of FIG. 3, the control for adjusting the time difference to be tT1+ΔT2 is conducted from the second frame and the subsequent frames. However, the control for adjusting the time difference to be ΔT1+ΔT2 may be conducted from the first frame.

In this way, the length of the frame display period is changed to match changes in the phase difference (in contrast to being ΔT1 with frame S1 and frame D1, being ΔT1+ΔT2 with frame S2 and frame D2). It is possible to realize synchronization of the image capturing sensor 15 and the display section 40 with the subsequent frame thereafter by temporarily changing the frame display period.

The higher the frame rate Fdmax, the shorter the length "a" of the shortest line display period, so it is possible to make the length of the second display region R2 display period shorter as well. As a result, the phase difference between the image capturing sensor 15 and the display section 40 also becomes smaller, and the display delay period becomes shorter. Also, by the phase difference becoming smaller, it is possible to make the buffer capacity for storing the image data of the first display region R1 of the next frame smaller. Also, the shorter that the shortest length "a" of the line display period is compared to the longest length "b" of the period in which one line of image data is generated, the more the display delay time can be reduced. The larger the number of second display region R2 lines there are, the longer the display delay period with the next frame, but the shorter the shortest length "a" of the line display period, the more it is possible to reduce the buffer capacity for storing the image data of the first display region R1 of the next frame, and it is possible to also make the display delay period shorter.

2. Second Embodiment

Figure 5:
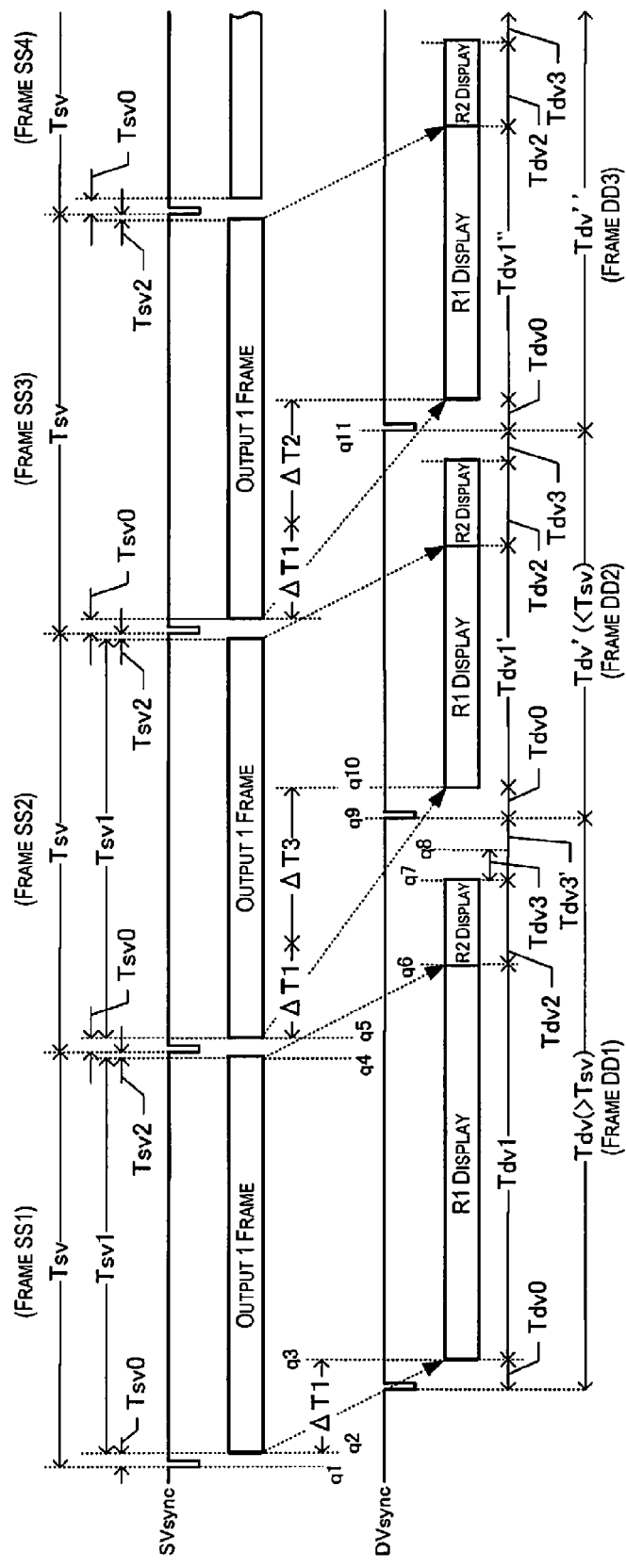
FIG. 5 is a timing chart showing operation of the image capturing sensor and the display section at the time of a live view mode with the second embodiment.

FIG. 5 is a timing chart showing the operation of the image capturing sensor and the display section when in the life view mode of the second embodiment. Rather than the frame DD1 not starting display of the first display region R1 until the image data of a plurality of lines is stored in the line buffer 52d, the image data of the first line is displayed immediately after one line of image data of the first display region R1 is output, and thereafter, display is performed each time one line of image data is output to the line buffer 52d. These are the same operating contents as frame D1 of FIG. 3 with the first embodiment. As a result, the length of the frame display period (vertical synchronization period) Tdv of the frame DD1 in FIG. 5 of the second embodiment becomes longer than the frame image capturing period (vertical synchronization period) Tsv of the image capturing sensor 15, the same as with the frame D1 of FIG. 3. Specifically, the frame rate (second frame rate) when the length of the frame display period Tdv of the frame DD1 continues as is shorter than the frame rate of the image capturing sensor 15.

Here, after the frame DD1 first display region R1 display period Tdv1 and the second display region R2 display period Tdv2 have ended, we will assume that for some reason, the vertical synchronization signal DVsync for starting the frame DD2 was generated with a delay. Specifically, the vertical synchronization signal DVsync is output at a timing q9 slightly delayed from the timing q8 when the front porch period Tdv3 of the frame DD1 ends. By there being a slight delay in the output of the vertical synchronization signal DVsync for starting the frame DD2, with the start timing q10 of the first display region R1 display period Tdv1' of the frame DD2 through the back porch period Tdv0 of frame DD2, compared to a case when the vertical synchronization signal DVsync is generated at timing q8 without being delayed, the state is such that many lines of image data are stored in the line buffer 52d. Specifically, the number of lines which are already stored at timing q10 for which period ΔT3 has further elapsed after ΔT1 (period required to generate the image data of the first line) has elapsed from timing q5 at which output of the output data of one frame of the frame SS2 starts is greater than the number of lines already stored at the timing (not illustrated) for which a period shorter than ΔT3 has further elapsed after period ΔT1 has elapsed from the timing q5.

Therefore, compared to when the vertical synchronization signal DVsync is generated at timing q8 without being delayed, the number of lines that can be displayed with the line display period of the shortest length "a" increases, so the length of the display period Tdv1' of the first display region R1 with frame DD2 becomes shorter. The length of the display period Tdv2 of the second display region R2 is the same as for frame DD1. When the vertical synchronization signal DVsync for starting the frame DD3 is generated without being delayed at timing q11 when the front porch period Tdv3 has elapsed, the length of the frame display period Tdv' of frame DD2 becomes shorter than the length of the frame image capturing period Tsv of the image capturing sensor 15. Specifically, the frame rate (first frame rate) when the length of the frame display period Tdv' of frame DD2 continues as is higher than the frame rate of the image capturing sensor 15. The fact that it is possible for the image capturing sensor 15 frame rate and the display section 40 frame rate from frame DD3 and thereafter to become equal is the same as with the first embodiment, so a description will be omitted.

Also, during the period when the frame DD1 ($N^{th}$ frame) is displayed at the second frame rate, it is possible to store image data of a plurality of lines of the frame DD2 ($N+1^{th}$ frame). Specifically, a portion of the period ΔT3 for storing the image data of a plurality of lines of the first display region R1 of the frame DD2 is included in the period of the frame display period Tdv of frame DD1. Also, as shown in frame DD2, the first display region R1 and the second display region R2 are displayed after image data of a plurality of lines are stored (after period ΔT3).

3. Other Embodiments

The technical scope of the invention is not limited to the above-described embodiment. It is apparent that various changes and modifications can be made without substantially departing from the subject matter of the invention. For example, the above-described embodiment is configured such that the display control section 32 acquires from the resizing processing section 20e the line number Ld in which image data has been generated and has been output to the line buffer 52d for determining whether the display conditions are met, and it is determined that the display conditions are met when the relationship with respect to the next display target line Ln is Ln≤Ld. However, other various embodiments are possible. For example, the image data generation section may output a pulse signal to the display control section at a timing when generation of image data of one line is finished and outputting to a predetermined buffer is finished, and the display control section may count the number of outputting the pulse signal in one frame and determine that the display conditions are met when the line number shown by the number of outputting the pulse signal is equal to or more than the number of the next display target line.

Also, for example, the image data generation section counts up a counter at a timing when processing of the resizing processing section is finished and image data of the $N^{th}$ line is generated, and makes the value of the counter "N". The image data generation section outputs a pulse signal to the display control section at a timing when image data generation section counts up the counter, and issues a notice showing that the counter has been counted up. The display control section acquires the value of the counter showing a line in which generation of image data has been finished (showing to which line generation has been finished) at a timing when the display control section acquires the pulse signal. The display control section may determine that that the display conditions are met when the number of the next display target line is equal to or less than the value of the counter.

Figure 6A:
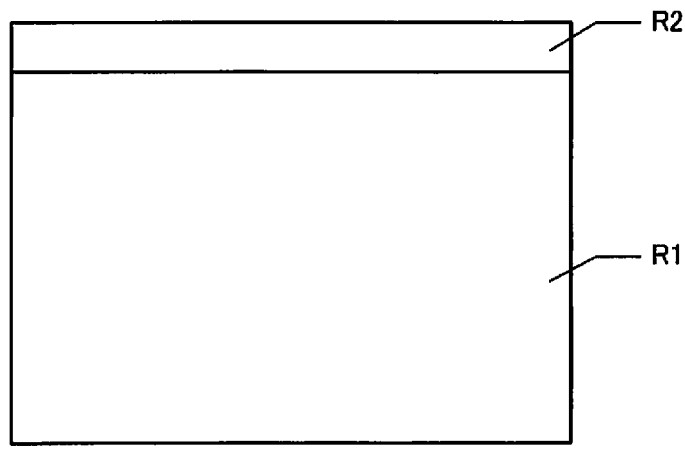
FIG. 6A and FIG. 6B are diagrams showing configuration examples of the display screen according to other embodiments.

The screen configuration of the display section 40 is not limited to the configuration of the first embodiment. For example, as shown in FIG. 6A, the first display region R1 and the second display region R2 may be opposite to the first embodiment. Specifically, a region of the display screen composed of the first line to the $n^{th}$ line may be the second display region R2 to display the OSD data. A region composed of "m" lines continuous with the second display region R2 may be the first display region R1 to display image data generated based on output data of the image capturing sensor 15. In such a case, a display on the second display region R2 is conducted with the line display period of the length "a" in the same manner as in the above-described embodiment. Image data of several lines for a display on the first display region R1 is stored in the line buffer 52d while a display on the second display region R2 is conducted. Therefore, image data of lines that have already been stored in the line buffer 52d can be displayed on the first display region R1 with the line display period of the length "a", and the period of the first display region R1 can be made shorter in the same manner as in the above-described embodiment. As a result, display data such as OSD can be displayed as well as image data based on output data of the image capturing sensor 15 in a period of the same length as the vertical synchronization period of the image capturing sensor 15, and the image capturing sensor 15 and the display section 40 can be operated in synchronization with each other. With the embodiment noted above, the first display region was a region constituted by a plurality of lines, and the width (length in the horizontal direction) was equal to the width of the display screen (length in the horizontal direction), but it is also possible to have the width of the display screen be shorter.

Figure 6B:
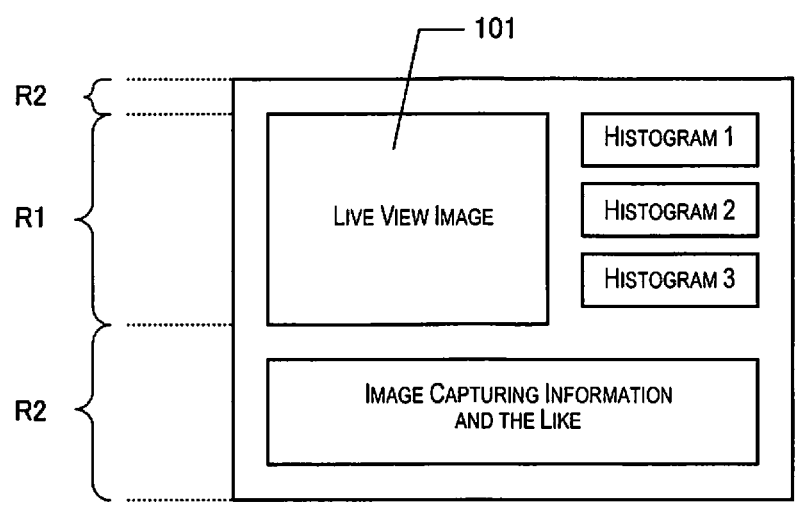

In the first embodiment or the example of FIG. 6A, image data generated based on the output data of the image capturing sensor 15 is displayed all over the width in the horizontal direction of the display screen. However, as shown in a live view image display region 101 of FIG. 6B, the width of the region to display image data generated based on output data of the image capturing sensor 15 may be smaller than the width of the display screen. In the example of FIG. 6B, a region (whose width is the same as the width of the display screen) composed of lines including the live view image display region 101 is the first display region R1 (region for displaying display data including image data generated based on output data of the image capturing sensor 15). The other region (whose width is the same as the width of the display screen) is the second display region R2 (region for displaying display data that does not include image data generated based on output data of the image capturing sensor 15). Display data for the region other than the live view image display region 101 (display regions for histograms 1, 2, and 3, the display region for image capturing conditions and the like, and a background section other than these) is generated and stored in the VRAM 51. The image data output section 21 acquires image data from the line buffer 52*d* for a display on the live view image display region 101 and acquires data from the VRAM 51 for a display on the other region so as to output the acquired data to the display section 40. Since the first display region R1 includes the live view image display region 101, when image data of a plurality of lines is stored in the line buffer 52*d*, a display can be conducted with the shortest length "a". However, in a case where the display conditions are not met, it is necessary to wait to display until the display conditions are met. Therefore, a display on the first display region R1 is conducted with the line display period having a length of "a" or more to "b" or less. On the other hand, a display on the second display region R2 can be conducted with the line display period having a length of "a".

When in live view mode, even when the screen configuration (layout) is modified (when the arrangement and ratio of the first display region R1 and the second display region R2 are switched), by having a configuration like that described with the embodiments noted above (a configuration having a buffer that stores a plurality of lines of first display region image data, and that displays already stored image data or display data of the second display region R2 at a length "a" shorter than "b"), after at the shortest one frame has elapsed, it is possible to synchronize the image capturing sensor 15 and the display section 40. Specifically, even when the screen configuration is switched when in live view mode, it is possible to realize stable synchronization of the image capturing sensor 15 and the display section 40 at the shortest at from 2 frames after switching.

In the first embodiment, the image capturing sensor 15 and the display section 40 are operated in synchronization with each other in a case where Fdmax is greater than Fs and "a" is smaller than "b", but of course the image capturing sensor 15 and the display section 40 can also be operated in synchronization with each other in a case where Fdmax is equal to Fs. For example, when a display is started from the first line of the first display region R1 after image data of "m" lines for a display on the first display region R1 is stored in the line buffer 52*d*, a display of "m" lines on the first display region R1 can be conducted with the line display period of the length "a" (because there is no need to wait until the display conditions are met in any line). Also, in such a case, the length "a" does not need to be always shorter than the length "b", and for example, "a" may be equal to "b". With respect to the second display region R2, a display of "n" lines can be conducted with the line display period of the length "a" by using the OSD data recorded on the VRAM 51. When the frame rate Fdmax of the display section 40 in the case of outputting the horizontal synchronization signal DHsync with the line display period of the length "a" is equal to the actual frame rate Fs of the image capturing sensor 15, the lengths of the vertical synchronization periods become equal, and thus the image capturing sensor 15 and the display section 40 can be operated in synchronization with each other. In the case of this example, however, since a display is started from the first line of the first display region R1 after image data of "m" lines of the first display region R1 is stored in the line buffer 52*d*, the display delay time from outputting the output data of the first line by the image capturing sensor 15 until starting a display on the first display region R1 becomes longer than the first embodiment. Therefore, in order to make the display delay time as small as possible and synchronize the image capturing sensor 15 and the display section 40, the first embodiment in which Fdmax is greater than Fs and "a" is smaller than "b" is preferred.

What is claimed is:

1. An image capturing device comprising:
    an image capturing sensor that captures an image of an object;
    an image data generation section operatively coupled to the image capturing sensor and to generate captured image data showing the captured image of the object per line of a display section based on output data of the image capturing sensor;
    a buffer that has capacity to store a plurality of lines of the captured image data; and
    a display control section operatively coupled to the image data generation section to cause each line of display data including the captured image data to be displayed on a first display region of a display screen of the display section, which is constructed by the first display region and a second display region, with a line display period having a length of "a" or more to "b" or less after the plurality of lines of the captured image data are stored in the buffer, and to cause each line of display data that does not include the captured image data to be displayed on the second display region with a line display period having a length of "a",
    "a" referring to a shortest length of the line display period corresponding to a frame rate of the display section, with the frame rate as display capability of the display section being higher than a frame rate of the image capturing sensor, and
    "b" referring to a maximum length of a period for generating one line of the captured image data in a case where the image capturing sensor is operated at the frame rate of the image capturing sensor, with "a" being shorter than "b".

2. The image capturing device according to claim 1, wherein the display control section waits to start a display of a next display target line on the first display region until display conditions for displaying the next display target line are met, and displays the next display target line after the display conditions are met.

3. The image capturing device according to claim 2, wherein the display control section displays a current display target line on the first display region with the line display period of the length "a" in a case where there is no need to wait to start a display of the next display target line until the display conditions for displaying the next display target line are met.

4. The image capturing device according to claim 2, wherein the image data generation section outputs the captured image data sequentially to the buffer, and in a case where the first display region is a region of "m" continuous lines ("m" is a natural number), the display control section causes a first line to an m$^{th}$ line of the first display region to be displayed with a line display period having a length of "a" or more to "b" or less based on the image data stored in the buffer after storing image data starting from the first line of the first display region up to an $i^{th}$ line ("i" is a natural number that satisfies $1 \leq i \leq m$) in the buffer is finished.

5. An image capturing device control method comprising:
- an image data generation process that generates, by an image data generation section, captured image data showing captured image of an object per line of a display section based on output data of an image capturing sensor for capturing an image of an object; and
- a display control process that causes, by a display control section, each line of display data including the captured image data to be displayed on a first display region of a display screen of the display section, which is constructed by the first display region and a second display region, with a line display period having a length of "a" or more to "b" or less after a plurality of lines of the captured image data are stored in the buffer, and causes each line of display data that does not include the captured image data to be displayed on the second display region with a line display period having a length of "a",
- "a" referring to a shortest length of the line display period corresponding to a frame rate of the display section, with the frame rate as display capability of the display section being higher than a frame rate of the image capturing sensor, and
- "b" referring to a maximum length of a period for generating one line of the captured image data in a case where the image capturing sensor is operated at the frame rate of the image capturing sensor, with "a" being shorter than "b".

6. An image capturing device comprising:
- an image capturing sensor that captures and image of an object;
- an image data generation section operatively coupled to the image capturing sensor to generate captured image data showing the captured image of the object per line of a display section based on output data of the image capturing sensor;
- a buffer that stores the captured, image data; and
- a display control section operatively coupled to the captured image data generation section to cause display data that includes the captured image data to be displayed on a first display region of a display screen of the display section and to cause display data that does not include the captured image data to be displayed on a second display region of the display screen, wherein
- a line display period of the display section is shorter than a period for generating one line of the captured image data of in a case where the image capturing sensor is operated at a frame rate of the image capturing sensor, and
- the display control section displays the display data including the captured image data in the first display region and the display data that does not include the captured image data in the second display region of the display section at a first frame rate higher than the frame rate of the image capturing sensor after a plurality of lines of the captured image data are stored in the buffer.

7. The image capturing device according to claim 6, wherein the display control section waits to start a display of a next display target line on the first display region until display conditions for displaying the next display target line are met, and displays the next display target line after the display conditions are met, and
until the image data of a plurality of lines is stored in the buffer, the first display region and the second display region are displayed at a second frame rate that is lower than the first frame rate.

8. The image capturing device according to claim 7, wherein the buffer stores the image data of a plurality of lines of the $(N+1)^{th}$ frame while the display control section displays the $N^{th}$ frame (N is a natural number) at the second frame rate.

9. The image capturing device according to claim 6, wherein the display control section controls such that the first display region and the second display region are displayed after the image data of a plurality of lines is stored in the buffer.

10. The image capturing device according to claim 1, further comprising
a storage section that stores the display data to be displayed on the second display region that has been generated independently from the output data of the image capturing sensor.

11. The image capturing device control method according to claim 5, further comprising
storing in a storage section that display data to be displayed on the second display region that has been generated independently from the output data of the image capturing sensor.

12. The image capturing device according to claim 6, further comprising
a storage section that stores the display data to be displayed on the second display region that has been generated independently from the output data of the image capturing sensor.

* * * * *